Aug. 4, 1959 G. L. HAUGEN 2,898,478
REDUCTION OF MULTIVIBRATOR RECOVERY TIME
Filed March 21, 1957
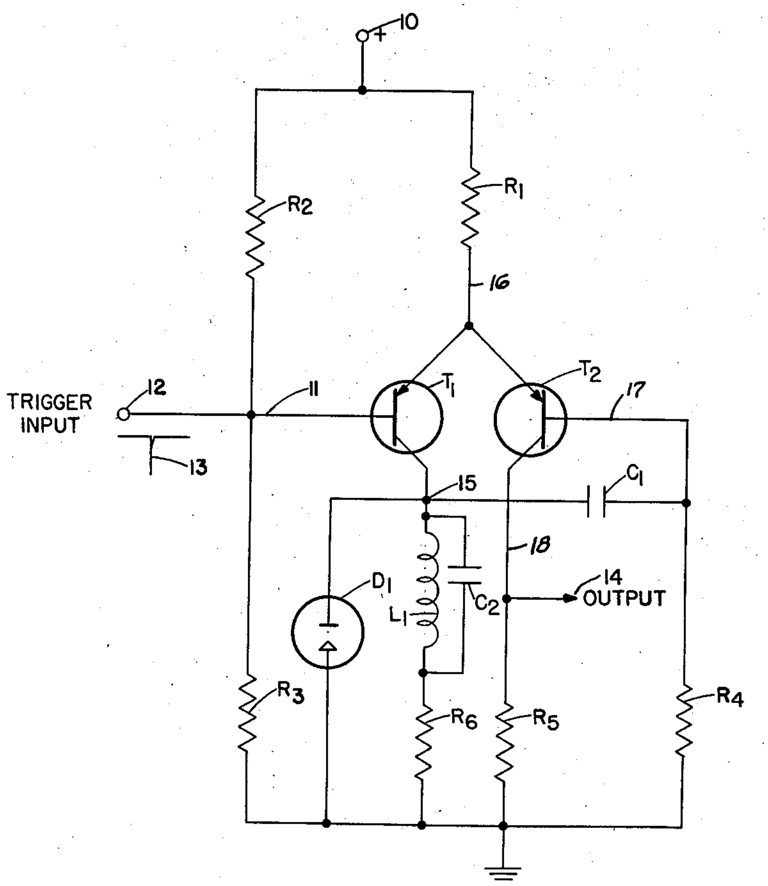
GLENN L. HAUGEN
Inventor
By Killman and Kerst
Attorneys

United States Patent Office 2,898,478

Patented Aug. 4, 1959

2,898,478

REDUCTION OF MULTIVIBRATOR RECOVERY TIME

Glenn L. Haugen, Glenarm, Md., assignor to Bendix Aviation Corporation, Towson, Md., a corporation of Delaware Application March 21, 1957, Serial No. 647,557

3 Claims. (Cl. 307—88.5)

This invention relates to multivibrators of the monostable type and is directed to the reduction of the time required after the termination of a pulse of the multivibrator before a succeeding pulse of identical characteristics may be initiated.

For certain uses of multivibrators of this type it is desirable to obtain the highest possible pulse repetition rate. The limit to this rate is set by the recovery time of the circuit. It is necessary to allow the circuit to return completely to its stable condition before a new pulse is initiated. Otherwise, the new pulse will be of shorter duration than its predecessor.

It is an object of this invention to reduce the recovery time of a monostable multivibrator by a considerable amount and to thus greatly increase the pulse repetition frequency which may be attained, without effect on the pulse duration.

It is a further object of the invention to accomplish this result by means which are simple and inexpensive.

These and other objects and advantages of the invention are realized by a monostable multivibrator circuit in which one of the couplings between the two stages of the circuit is by way of a timing network comprising a capacitor and serially connected resistors, distinguished in this case by the addition of an inductor in series with the network. If desired, a diode may be shunted across a portion of the network, the latter being so poled as to afford a low impedance discharge path for the inductor during the recovery portion of the cycle. The addition of the diode results in easing manufacturing tolerances for the inductor and capacitor.

The single figure of the drawing is a schematic diagram of a circuit embodying the invention.

The illustrated circuit comprises a pair of transistors $T_1$ and $T_2$, which may be of the PNP junction type. The emitters are connected through a common conductor 16 and resistor $R_1$ to a positive terminal 10 of a source of supply voltage. The base of transistor $T_1$ is connected by a lead 11 to a terminal 12, at which a series of triggering impulses indicated by the graph 13 are applied to the circuit. The lead 11 is connected to terminal 10 by way of a resistor $R_2$ and to ground by a resistor $R_3$.

The base of transistor $T_2$ is connected to ground by means of a conductor 17 and a resistor $R_4$. The collector of this transistor is connected by a conductor 18 to an output terminal 14 and to ground by way of a resistor $R_5$.

The collector of $T_1$ is coupled to the base of $T_2$ by a capacitor $C_1$. The junction 15 of the collector of $T_1$ and the capacitor $C_1$ is connected to ground by a network having two parallel branches, in one of which is a series arrangement of an inductor $L_1$ and a resistor $R_6$, which latter includes the resistance of $L_1$ and may be consolidated in $L_1$ by design. The inductor is shunted by a capacitor $C_2$. The second parallel branch includes a diode $D_1$ having its cathode connected to the aforesaid junction.

Typical values of the components are as follows:

$R_1$=91 ohms
$R_2$=390 ohms
$R_3$=1300 ohms
$R_4$=27,000 ohms
$R_5$=270 ohms
$R_6$=330 ohms, plus 80 ohms from $L_1$
$L_1$=100 millihenries
$C_1$=0.35 microfarad
$C_2$=500 micro-microfarads With the values specified, the transistors are alternately cut-off or saturated, hence the current and potential values are closely calculable for any given supply potential. For example, I may assume that the terminal 10 is biased 12 volts positive with respect to ground and that transistors $T_1$ and $T_2$ are typical PNP types capable of handling the potential and current values obtained, and further, that the ratio of collector current to base current is of the order of 200. In the quiescent state, the potential (positive with respect to ground) of lead 11 will be 9.23 volts, of lead 18 will be 8.95 volts, of point 15 will be 0 volts, of lead 16 will be 8.98 volts and of lead 17 will be 8.97 volts, the condition of $T_1$ cut-off and $T_2$ saturated. This stable condition may be changed to the astable condition, with $T_1$ saturated and $T_2$ cut-off, by application of a brief negative trigger pulse 13 to lead 11 by way of terminal 12, as shown, or by application of a brief positive pulse to lead 17, either directly or by way of condenser $C_1$ from point 15. The large loop gain arising from coupling $T_1$ and $T_2$ in one direction by way of the common emitter resistor $R_1$ and in the other direction by way of the network including $R_4$, $R_6$ and $C_1$ assures a rapid transition to the astable state, whether initiated by turning on current in $T_1$ or reducing current through $T_2$. Then lead 11 will stand at 9.71 volts (positive with respect to ground), lead 18 at 0 volts, point 15 at 9.69 volts and lead 16 at 9.72 volts. Since lead 17 is coupled to point 15 by way of $C_1$ and dominated thereby, its potential will rise to 18.65 volts, from which value it will promptly begin to decline toward ground potential at a rate which is a function of the product of the value of capacity of $C_1$ and substantially the serial value of resistors $R_4$ and $R_6$. After passage of a period of time sufficient for the potential of lead 17 to fall to 9.70 volts, current will begin to flow through $T_2$ and the regenerative feedback will then rapidly restore the stable conditions from which the cycle started, except that condenser $C_1$ is initially left with a negative charge equivalent to a few hundredths of a volt potential difference across its terminals, whereas it started with a positive charge equivalent to 8.97 volts potential difference. Therefore, the condenser $C_1$ must be charged sufficiently to produce a net change of 9.00 volts potential difference before the multivibrator is triggered again, if the length of the output pulse at lead 14 is to remain constant. Earlier triggering will result in shortening of the output pulse proportional to the defect in the charge.

In the absence of $L_1$ or $D_1$, the condenser $C_1$ would be charged by the power source connected between terminal 10 and ground by way of the serial path comprising $R_1$, conductor 16, the emitter base junction of $T_2$, conductor 17, point 15 and $R_6$ with some increasing diversion of current through $R_5$ and a small potential drop across the emitter-base junction. Of the several elements which influence the charging current, $R_6$ obviously is the most significant and if it could be bypassed the charging current would be increased and the charging time decreased several fold. This is difficult to accomplish cheaply with conventional means because the initial value of the charging current through $R_6$ wil always be substantially identical with the current which passes through it by way of $T_1$ during the astable condition, which must not be bypassed. If now I add to the conventional circuit the inductor $L_1$ and choose its value, so that the energy stored in its magnetic field during the astable period is just sufficient to accomplish the charging of $C_1$, the net result will be equivalent to bypassing $R_6$. If $L_1$ is smaller, it will still contribute the proper initial value of current, since this is equal to the current just cut-off through $T_1$, but its contribution will decline too rapidly, thus lengthening the period required to charge condenser $C_1$ from the minimum time. If $L_1$ is larger, it will still supply the proper initial value of current to charge condenser $C_1$ but its contribution will decline too slowly, so condenser $C_1$ will be temporarily overcharged and an early trigger may result in producing a pulse which is too short, normal or too long, depending on its timing. However, if I make $L_1$ too large, and then add the diode $D_1$, the excess current will flow through the diode and condenser $C_1$ is charged in the minimum time, while I avoid the practical difficulty of manufacturing $L_1$ and $C_1$ to close tolerances. This avoids another practical defect which arises from the fact that $L_1$ is generally accompanied by a significant value of distributed capacity, here shown as $C_2$, which disturbs any attempt at precise correspondence between the discharge current of $L_1$ and the charge current of $C_1$. However, it should be noted that a very considerable benefit may be derived from addition of the inductor $L_1$ without the diode $D_1$ while employing normal commercial tolerances, which may be adequate for many uses.

It should be understood that the values set forth above are by way of example only, and should not be taken as limitations to the invention. Furthermore, while the embodiment illustrated employs transistors the invention is equally applicable to vacuum tube circuits.

What is claimed is:

1. A monostable multivibrator comprising means forming a pair of amplifying stages having a regenerative feedback coupling therebetween, means biasing a first of said stages to cut-off, a capacitor coupling the output of said first stage to the input of the second of said stages, means applying to said multivibrator triggering impulses of sufficient amplitude to initiate a transition therein from the stable to the unstable state thereof, a source of charging potential, a charging network connecting the terminals of said capacitor, said network comprising an inductor connected between the junction of said first stage with said capacitor and said source, a diode shunting said inductor, said diode being poled to present a high impedance to said first stage when said first stage is conducting and being directly connected between said junction and said source.

2. A monostable multivibrator comprising a pair of transistors, a source of supply voltage, an impedance element connecting the emitters of said transistors in common to a terminal of said source, a capacitor coupling the collector of a first of said transistors to the base of the second, impedance means connecting the collectors of said transistors and the base of said second transistor to the other terminal of said source, means biasing the collector of said first transistor such that said first transistor is normally cut-off and means periodically applying a negative-going triggering impulse to the base of said first transistor, said impedance means connecting the collector of said first transistor to said other terminal comprising an inductor and a diode shunting said inductor, the anode of said diode being directly connected to said other terminal.

3. In a monostable multivibrator circuit of the type comprising a pair of transistors having their emitters connected by a common impedance element to a terminal of a source of supply voltage, the collector of a first of said transistors being capacitively coupled to the base of the second, the collectors of said transistors and the base of said second transistors being connected to the other terminal of said source by way of resistive elements, and the base of said first transistor being biased in a manner such that said first transistor is normally cut off, the improvement which comprises: an inductor connected between said collector of said first transistor and said other terminal, and a diode shunting said inductor, said diode being poled to present a high impedance to said collector of said first transistor while said first transistor is conducting and being directly connected between said collector and said first transistor and said other terminal.

References Cited in the file of this patent

UNITED STATES PATENTS

| | | |
|---|---|---|
| 2,405,237 | Ruhlig | Aug. 6, 1946 |
| 2,426,205 | Grieg et al. | Aug. 26, 1947 |
| 2,605,306 | Eberhard | July 29, 1952 |
| 2,759,104 | Skellett | Aug. 14, 1956 |
| 2,776,420 | Woll | Jan. 1, 1957 |